Feb. 17, 1953  C. H. ECKART ET AL  2,629,084
ECHO RANGING SYSTEM
Filed April 25, 1944  4 Sheets-Sheet 1
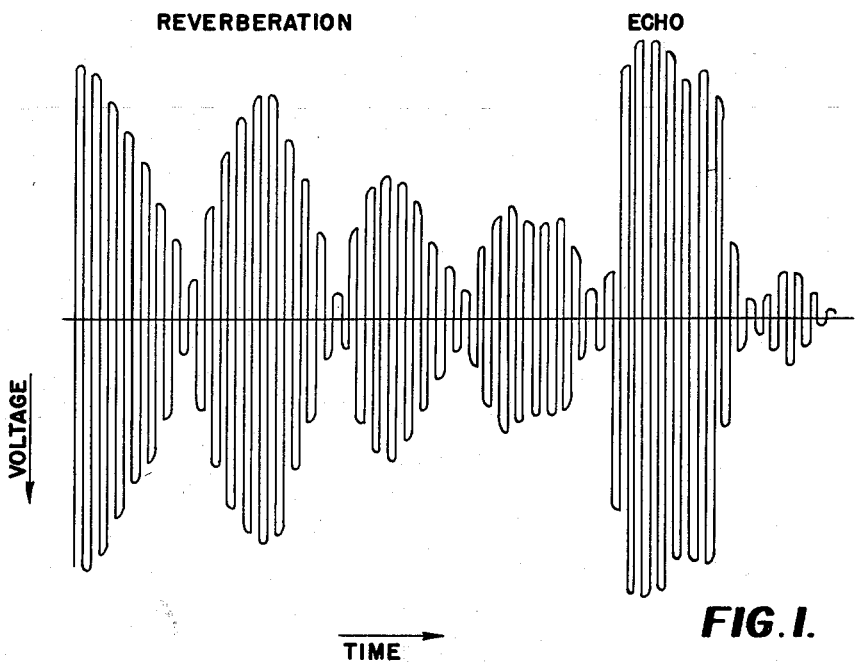
FIG. I.
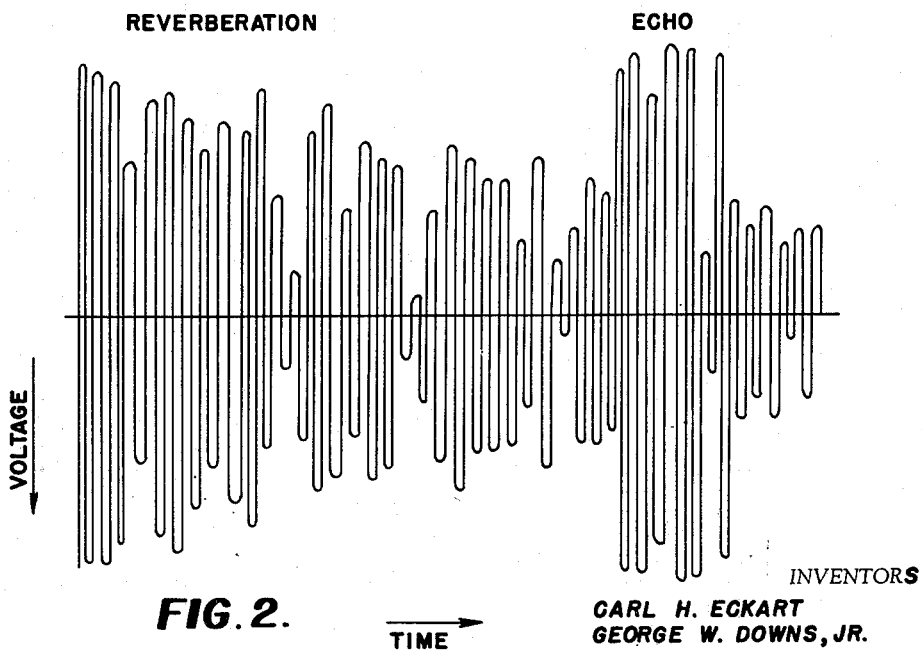
FIG. 2.
INVENTORS
CARL H. ECKART
GEORGE W. DOWNS, JR.
BY
ATTORNEY Feb. 17, 1953 C. H. ECKART ET AL 2,629,084
ECHO RANGING SYSTEM
Filed April 25, 1944 4 Sheets-Sheet 3
FIG. 4.
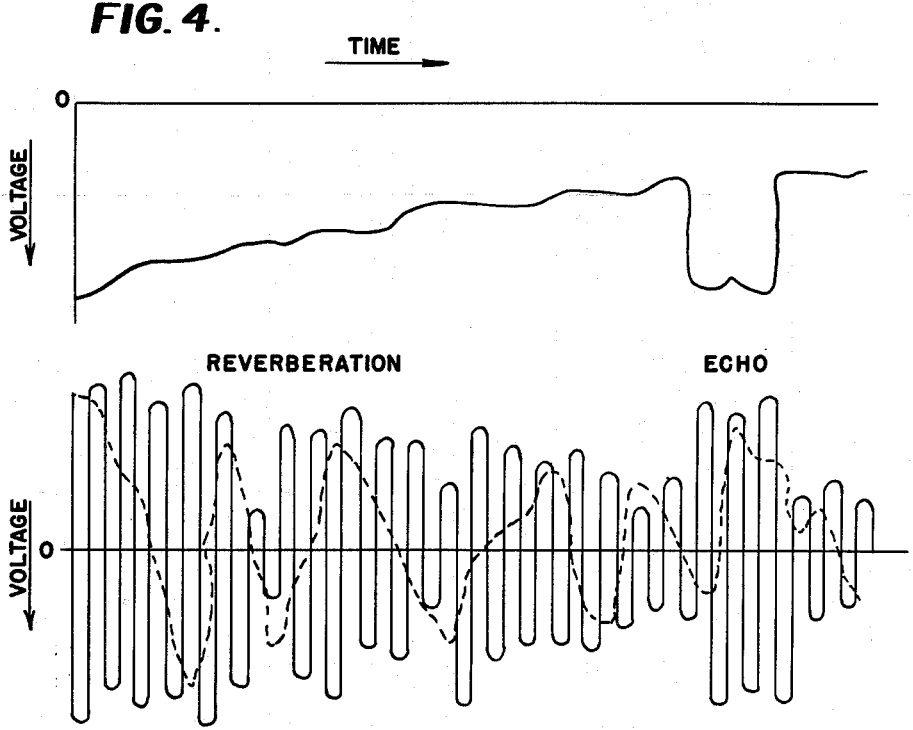
FIG. 5.
P
---- Δ=0
——— Δ≠0
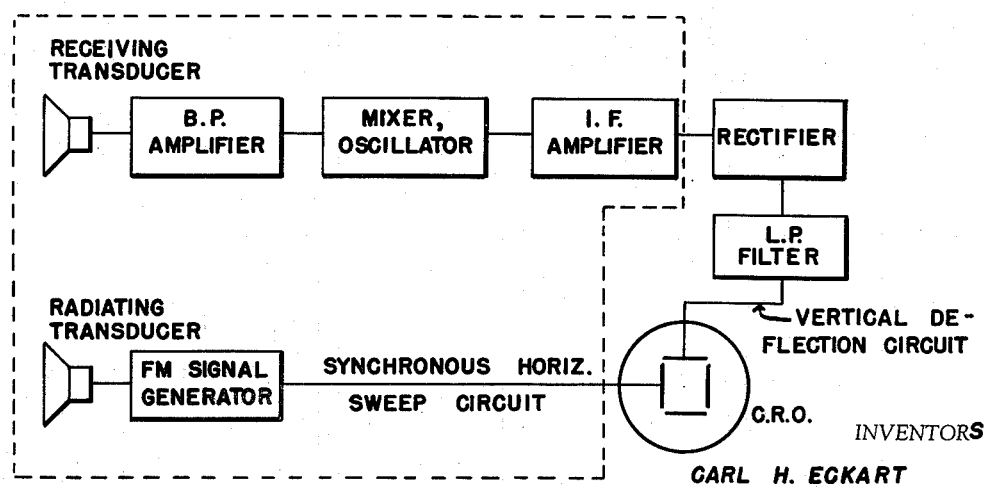
FIG. 6.
INVENTORS
CARL H. ECKART
GEORGE W. DOWNS, JR.
BY
ATTORNEY

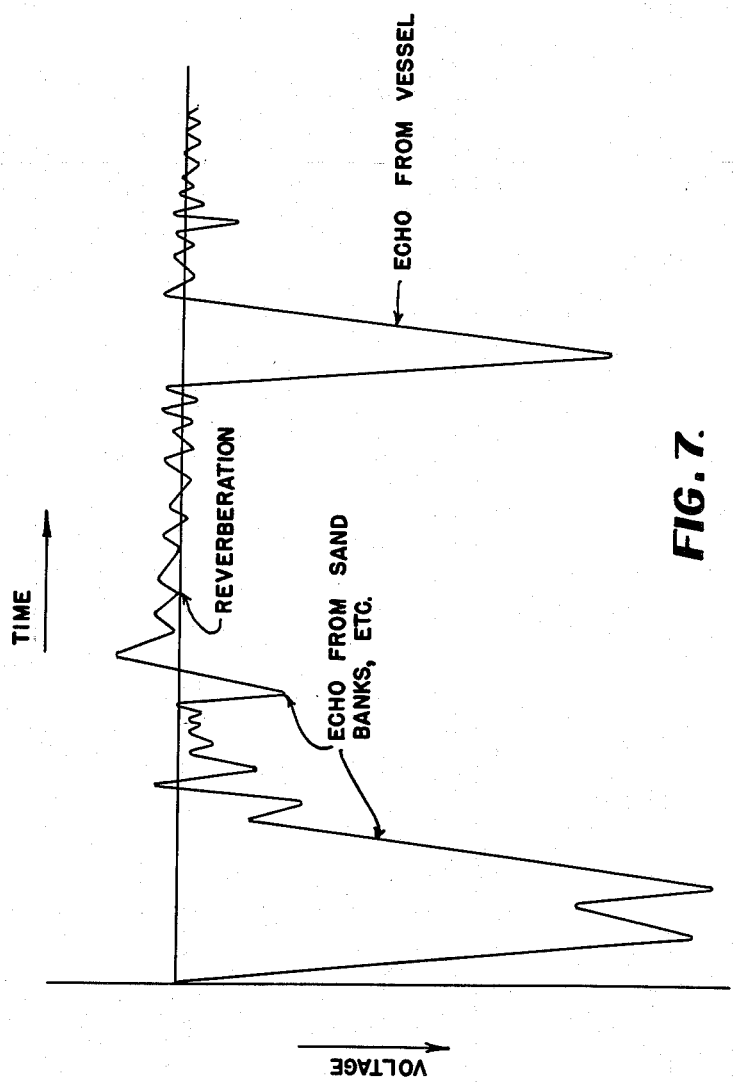

Patented Feb. 17, 1953

2,629,084

UNITED STATES PATENT OFFICE 2,629,084

ECHO RANGING SYSTEM

Carl H. Eckart, San Diego, and George W. Downs, Jr., Pasadena, Calif., assignors to the United States of America as represented by the Secretary of the Navy Application April 25, 1944, Serial No. 532,632

2 Claims. (Cl. 340—3)

This invention relates to a system and method of echo ranging.

In the past, the art of echo ranging, which consists in measuring the time consumed in a transmitted wave traveling to and being reflected from a target, has been largely restricted to the use of waves of constant frequency. Thus, a short signal, referred to as a ping, is transmitted into the acoustic medium, which may be air or water, and the distance to a target (which reflects the wave) is determined from the velocity of the wave in the medium, and the time intervening between the transmission and the reception of the echo.

It has been found that in underwater sound ranging a noise phenomenon, producing so-called reverberation, is a difficulty which limits both accuracy and maximum range. This phenomenon, although it is herein referred to as a noise, is a sound of nearly the same pitch as the transmitted signal, whose nature is not entirely understood. However, there is considerable evidence that reverberation is caused by multitudinous echoes of the wave from the irregularities in surface or the bottom, and by scatterers of unknown nature in the body of the sea. Thus, when a signal is transmitted into the water, a nearby receiver responds to this high background noise whose intensity decreases with time. In some cases, the intensity of such reverberation is so great that it is difficult to distinguish on echo returned by a real target from reverberation. Also, the character of the reverberation may change from ping to ping in a manner to indicate false drift or movement of the target. These numerous difficulties are found to be greater when long ranges are involved (due in part to greater attenuation of the real echo) and it is thus one of the objects of the invention to provide an echo-ranging system suitable for giving accurate information about target at long ranges.

Obviously, too, another important object of the invention is to provide a system for echo ranging which will detect a target when the echo to reverberation (signal to noise) ratio is highly unfavorable such that the echo is masked by reverberation.

Another object of the invention is to provide a system for echo ranging which enables an operator to obtain more accurate bearings by the cut-on and cut-off method because the masking of the echo by reverberation is greatly reduced.

A further object of the invention is to provide a system of fire control which provides accurate information as to the position of a target.

Still another object of the invention is to provide apparatus which may be used in conjunction with conventional echo-ranging gear to improve the accuracy of the information obtained by such gear.

Yet another object is to provide a system and device for echo ranging which does not rely on the existence of the Doppler effect (or the operator's ability to recognize such effect) for the detection of weak echoes.

And an even further object of the invention is to provide an auxiliary device for improving the operation of existing echo-ranging equipment, which device is compact and simple.

In the drawings:

Figure 1 is a sketch of a representative trace on a CRO produced when the heterodyned voltage from reverberation and echo due to an unmodulated ping is impressed on its plates.

Figure 2 is a sketch similar to Fig. 1 produced when the heterodyned voltage from the reverberation and echo due to an FM chirp signal is impressed on the plates of a CRO.

Figure 4 is a sketch showing the time variation of one of the components shown in Fig. 3.

Figure 5 is a sketch showing the time variation of another of the components shown in Fig. 3.

Figure 6 is a block diagram of the invention.

Figure 7 is a sketch of a representative CFO trace produced when an echo is received by the system utilizing the invention.

Figure 3:
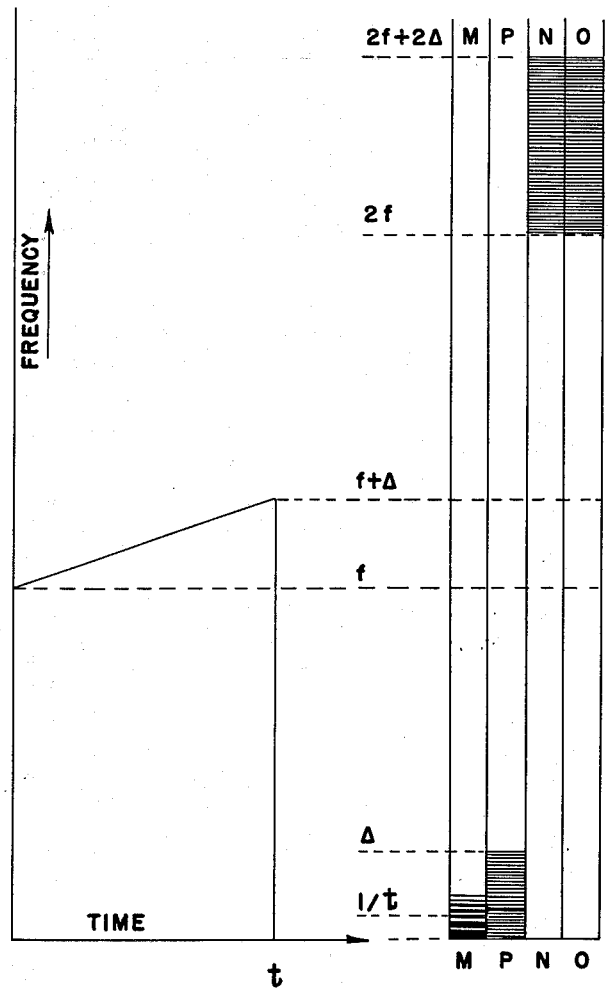
Figure 3 is a graph showing the spectra of the various components of the reverberation or echo from a chirp signal after rectification by a square-law amplifier.

In prior art systems, when short, fixed carrier frequency pings are used in echo ranging, an attempt is made to utilize two factors in differentiating the echo from the reverberation. The first factor is the distinctive quality of the echo as compared with the reveberation, i. e., there are distinguishing differences in both the frequency and the wave forms of each. The other is the intensity difference, as under good conditions the intensity of the echo is considerably higher than that of the reverberation. However, when such a fixed carrier frequency ping is transmitted, the echo from a stationary target and reverberation are similar and during a large percentage of the time it is difficult or even impossible to make any qualitative distinction whatever. Thus, in the absence of additional distinctive qualities such as a frequency shift caused by the Doppler effect it is necessary to rely almost entirely on the intensity difference between echo and reverberation.

This is very difficult when the intensities of the echo and the reverberation are nearly the same because the reverberation fluctuates with time; and unfortunately the duration of the periods of high intensity reverberation are of the same general order of magnitude of the duration as the echo. Thus, it is easily possible to mistake a period of high intensity reverberation for an echo, and vice versa. This is particularly true when fixed carrier frequency systems are used for echo ranging at long ranges or in shallow water with rocky bottom.

The apparatus of the present invention employs frequency modulation of the carrier frequency in emitted ping signals. In the ideal case, it is readily seen that there is a qualitative difference between the reverberation and the echo when such carrier frequency modulated chirps are used. The echo presents the frequencies in their original order of emission while the reverberation is reduced to a hiss or toneless noise, because it contains all frequencies at once. This latter effect is readily explained in that the scatterers and boundaries producing it are arranged in random fashion about the transmitter and receiver. The numerous echoes which combine to cause reverberation thus arrive at the receiver at varying amplitudes, phases, times, and, of course, frequencies.

It has been suggested that these two qualities audible differences are, in themselves, sufficient to make the use of an FM chirp advantageous even with aural methods of detecting the echo. However, experience has shown that this is not true and that such operation shows little improvement and that only under limited operating conditions.

Since the invention is based upon the differences in character of the reverberation as produced by the constant frequency ping and the FM chirp, Fig. 1 is intended to show the trace on a CRO screen of the output voltage of a receiver actuated by ping reverberation and an echo.

Figure 2 shows a similar trace made by the reverberation and echo from an FM chirp. It is obvious from comparing Figs. 1 and 2 that the use of the FM chirp equalizes the peaks and valleys produced by the fluctuations in intensity of the reverberation, or rather, decreases the time interval between successive peaks and valleys until it is so small as to be imperceptible by the ear. As a consequence, the echo peak will not be so readily obscured by them even if it is weak.

The invention consists in a system capable of utilizing this difference between the reverberation and echo when an FM chirp is used. Since the use of the FM chirp reduces the duration of the periods of high intensity of reverberation relative to the periods of low intensity reverberation, they are, as compared to the duration of the echo, very small. This fact, is of course, partially responsible for the qualitative differences noted above. The invention also consists in rectifying this alternating voltage to produce a unidirectional but varying voltage and supplying it to a low-pass filter whose time constants are chosen to suppress the short period peaks and to pass the long period echo peak.

Briefly then, the invention consists in the emission of pulses of carrier frequency energy or "chirps" wherein the carrier frequency is modulated or varied during the individual pulses or "chirps." This type of signal emission is in contrast to the pulses of fixed carrier frequency normally employed in locator systems of this type. When such carrier frequency modulated signals are received by echo from a distant energy reflective object under conditions where reverberation is substantial, the frequency of fluctuation of the reverberation is increased relative to that encountered in conventional systems and the amplitude of such fluctuation is reduced as shown in Fig. 2 to permit its rejection by simple filter means. The desired echo components which will reproduce the relatively broad fluctuations of the emitted pulses are inherently of a lower frequency nature which will be passed by the filter means just mentioned.

The apparatus embodying the basic features of the present invention as typified in Fig. 6 comprises an FM signal generator which produces a series of pulses of carrier frequency energy as is commonly encountered in locator systems, the specific requirement here being that the carrier frequency energy emitted is frequency modulated. The FM signal generator is connected to the radiating transducer which provides energy delivery into a suitable medium wherein location operations are to be conducted. In the typical system this medium may be sea-water in which case the transducer would be a suitable device capable of emitting supersonic energy.

The apparatus includes for handling echo signals a series connection of a receiving transducer, a band-pass amplifier, a mixer, oscillator, an I. F. amplifier, a rectifier, a low-pass filter, a vertical deflection circuit, and a cathode ray oscilloscope. Also required as indicated is a suitable horizontal sweep circuit which is connected to the FM signal generator.

In the apparatus of Fig. 6 the FM pulse signal generator produces a series of recurrent pulses of carrier frequency energy which are delivered into the acoustic medium through the radiating transducer. As generated the carrier frequency employed in these pulses of energy is provided with frequency modulation. At the time the pulse is radiated by the radiating transducer the CRO begins its horizontal sweep as provided by the synchronous sweep circuit.

When reverberation and echo signals are received by the receiving transducer they are amplified by the band-pass amplifier (whose bandwidth is at least equal to the frequency modulation of the "chirp"). The amplified signals are then heterodyned in the mixer and oscillator stage to an intermediate frequency and amplified again by the I. F. amplifier. From here, the amplified signals are fed to the rectifier which provides a rectified signal varying as the peak amplitude of the carrier waves. The carrier frequency signals themselves are removed by the low-pass whose function has already been disclosed. The output of the filter is applied to the vertical deflection plates of the CRO which also receives horizontal deflection signals synchronized by the FM signal generator to start with the generation of each pulse of energy thereby.

If an echo is present the trace will somewhat resemble the representative one illustrated in Fig. 7. A new cycle is started every time the generator produces a chirp with the sweep circuit providing means for obtaining the synchronous flyback on the CRO.

In Fig. 6, the rectifier and filter have been shown to be fed from the I. F. amplifier. Although this has proven to be a most convenient and successful method of operation, it is intended that such connection might be made at other points in the receiver, such as at the radio- or audio-frequency stages.

With respect to the rectifier and filter, any type of rectifier may be utilized and it is unimportant whether linear or square-law operation is used. Additionally, any low-pass filter, preferably one with moderately sharp cut-off, may be utilized although we have found that on some types of equipment, a cut-off slope of about 18 db per octave is about the maximum that will perform satisfactorily. The cut-off frequency may be chosen at any convenient frequency such as $3/\tau$. The smaller this value is chosen, the smoother will be the resulting trace but the less will be the contrast between echo and reverberation (because the filter begins to average the signal echo as well). For example, we have found that for operation with certain types of echo-ranging equipment a wave filter comprised of one-half section of an $m$-derived ($m=0.6$) low-pass, followed by a full section, constant $k$ low-pass, terminated by one-half section of an $m$-derived ($m=0.8$) low-pass is very useful. In this case the design was arranged that the cut-off frequency could be set for 100, 220, 465 or 1000 cycles per second. In another case, a simpler form of the resistance-capacitance type with three meshes was utilized. The R. C. product was made constant for all meshes, but the R./C. ratio was increased by two orders of magnitude in each successive mesh. Of course, where the invention is used as a part of existing equipment proper consideration must be given to choosing the terminating impedances such that proper operation of the gear is not interfered with.

In order that the invention be clearly understood, it is important that at least the conclusions of the mathematical analysis of the effects of the rectifier and filter used in the invention be presented.

Assume that the signal emitted by the receiver is of the form $$p(t) = A(t) \cos(\omega t + at^2/2) \quad (1)$$

where $p$ is the pressure at some point at time $t$, $A(t)$ the amplitude, and $\omega$ and $a$ constants. If it is supposed that $A(t)$ is zero outside the range $0 < t < \tau$, (where $\tau$ is the duration of the signal) and unity inside that range, then $\omega$ is the frequency at $t=0$, and $a\tau = \Delta$ is the sweep of the frequency modulation. For simplicity, it has been supposed that the sweeping rate, $a$, is constant, but this is not essential to the functioning of the invention. When $a$ and $\Delta$ are zero, the conventional unmodulated ping is represented. It is convenient to introduce the abbreviation defined by the equation $$\phi(t) = \omega t + at^2/2$$

The reverberation picked up by the ordinary receiver will produce an output voltage $v$, which may now be represented by an expression of the form $$v = \Sigma_n S_n p(t - \sigma_n) \quad (2)$$

Each term of this expression represents an ideal undistorted echo from surface or bottom irregularities or other scatterers which is picked up with a time lag $\sigma_n$, and amplitude $S_n$. The reverberation is the resultant of a number of such undistorted components, and the interference of these components results in the complexities of the observed sounds or CRO patterns. The ideal echo is represented by a single such component, but actual echoes may also be the resultant of several of such components. Thus, in the following discussion, no distinction will be made in the treatment of the real echo and the reverberation.

The retardations $\sigma_n$ may have all positive values. However, because of the finite duration of the signal, only those for which $0 < t - \sigma_n < \tau$ need be considered at any particular instant $t$. Consequently, it may be said that $|\sigma_n - \sigma_m| < \tau$.

In the invention, the voltage $v$ is rectified by some form of detector whose will, for simplicity, be assumed proportional to $$w = v^2 \quad (3)$$

It should be noted, however, that although the quantitative discussion proceeds on the basis of such square-law detection, the essential conclusions will be unaltered for all other types of detection. Additionally, although no heterodyne stages are assumed, these may be utilized without changing the essential results of the analysis. On squaring Expression 2, both the squares of individual terms and the products of pairs are obtained, and it is thus convenient to set $$w = w_1 + w_2 \quad (4)$$

where $$w_1 = \Sigma_n S_n^2 [p(t - \sigma_n)]^2 \quad (5)$$

and $$w_2 = 2\Sigma_{n>m} S_n S_m p(t - \sigma_n) p(t - \sigma_m) \quad (6)$$

Now, in Eq. 5, $$[p(t - \sigma_n)]^2 = \frac{1}{2}[A(t - \sigma_n)]^2 [1 + \cos 2\phi(t - \sigma_n)] \quad (7)$$

Hence, $w_1$ may be resolved into two components:

$$w_1 = M + N \quad (8)$$

where $$M = \frac{1}{2} \Sigma_n S_n^2 [A(t - \sigma_n)]^2 \quad (9)$$

and $$N = \Sigma_n S_n^2 [A(t - \sigma_n)]^2 \cos 2\phi(t - \sigma_n) \quad (10)$$

In the same way, it may be shown that $w_2$ may be similarly resolved:

$$w_2 = P + Q \quad (11)$$

where $$P = \Sigma_{n>m} S_n S_m A(t - \sigma_n) A(t - \sigma_m) \cos[\phi(t - \sigma_n) - \phi(t - \sigma_m)] \quad (12)$$

and $$Q = \Sigma_{n>m} S_n S_m A(t - \sigma_n) A(t - \sigma_m) \cos[\phi(t - \sigma_n) + \phi(t - \sigma_m)] \quad (13)$$

Thus, it is seen that the output of the detector is comprised of these four components, M, N, P, and Q, whose spectra are graphically illustrated in Fig. 3. From Eq. 9, it is clear that the spectrum of M depends only on A and $\tau$, and not on $\omega$ or $\Delta$. Its spectrum will be in the low-frequency range and have a strong D. C. component, if A is roughly rectangular, which is the case in conventional echo ranging. It may also be shown that the majority of the energy in the component M is in the frequencies less than $2/\tau$ or $3/\tau$ and may be as low as $1/\tau$.

With respect to the component P, since $$\phi(t - \sigma_n) - \phi(t - \sigma_m) = a(\sigma_m - \sigma_n)t + [\omega + \frac{1}{2}a(\sigma_m - \sigma_n)](\sigma_m - \sigma_n)$$

it is clear from Eq. 12 that its spectrum will also be independent of $\omega$ (though the phase relations do depend on $\omega$), but will be dependent on $a$ (i. e., on $\Delta$), $(\sigma_m - \sigma_n)$, A and $\tau$. In unmodulated ping transmission, where $\Delta = 0$, the dependence on $(\sigma_m - \sigma_n)$ disappears and the spectrum of P will thus be quite similar to that of M and will have the same upper limit, as for example, $3/\tau$.

But Eq. 9 shows that the component M is composed of positive terms only, thus producing a relatively regular output with a strong D. C. component, and one which, in the case of the echo, rather faithfully reproduces the envelope of the emitted sound, as is shown graphically in Fig. 4. In the case of the reverberation, this component will be a relatively steady D. C. component whose magnitude diminishes slowly with time. On the other hand, Eq. 12 shows that the component P contains both positive and negative terms and that, as a consequence, its D. C. component will be extremely weak when $\omega\tau \gg 1$ as illustrated in the dotted line of Fig. 5. Thus, even when there is no frequency modulation, P will be strongly variable and may be called a noise whose high frequency limit is about $(2 \text{ or } 3)/\tau$.

Physically, this noise arises from the interference of the component echoes. Its extrema occurs when this interference is constructive, it is zero when it is destructive. It is this noise which it is desired to eliminate because if one or more large fluctuations should occur during the time that the echo signal was present in component M, the latter would be very distorted, or even weakened so that there would be no indication of the target. The chance of such an eventuality is high. Conversely, it is the signal envelope, or rather that component, M, of the echo which more or less faithfully reproduces the emitted signal, which it is desired to retain. Parenthetically, it should be noted here that the M component of the reverberation is neither desirable nor very undesirable.

Thus, the signal envelope cannot be faithfully reproduced when $\Delta = 0$ because of the approximate equality of the periods of the fluctuation of the component P and the duration echo signal. This can, however, be accomplished in the invention because an FM chirp is used. It was seen in the analysis above that the frequency spectrum of P is radically changed when $\Delta \neq 0$, while the spectrum of M remains the same, regardless of the value of $\Delta$. When $\Delta$ is taken to be different than zero, the term $$\phi(t - \sigma_n) - \phi(t - \sigma_m)$$

from Eq. 12 is no longer constant in time, but changes with the angular frequency $a(\sigma_m - \sigma_n)$. Since $|a(\sigma_m - \sigma_n)|$ has all values between 0 and $\Delta$ for the various terms of Eq. 12, the energy of P will be more or less uniformly distributed over this new spectral range, as shown in Fig. 3, provided that $\Delta$ is considerably greater than $1/\tau$.

This new situation, wherein frequency modulation is used is also illustrated in Figs. 4 and 5. Since the value of M is not dependent on $\Delta$, its graph (Fig. 4) remains the same whether $\Delta = 0$ or $\Delta \neq 0$. But, as has been shown, the component P is radically changed and its fluctuations occur at a considerably higher rate when $\Delta \neq 0$, as shown in the full line of Fig. 5. It is, therefore, possible to choose the cut-off frequency of a low-pass filter such that it will reject most of the energy in the component P, but will pass the M component of the echo. With $\Delta = 0$, this is not possible, as remarked. Thus, the filter is utilized to eliminate all of the energy in the component P contained in the frequencies above the spectral range of M.

So far, no consideration has been given to the components N and Q. But, as is obvious from Fig. 3, these need not be considered in detail for they lie essentially above the lower limit $2\omega$, and the detector and filter will substantially eliminate them.

With respect to the magnitudes of M and P, it can be said that, mathematically, these are difficult to determine. However, it can be shown that M will be practically constant with only a small amount of variability superposed upon it, while P fluctuates between the values of $+M$ and $-M$ about once every $1/\Delta$ seconds.

With respect to the rectifier and filter, the elements involving the new features, little need be said about their design. Any type of rectifier may be utilized and it is unimportant whether linear or square-law operation is used. Additionally, any low-pass filter, preferably one with moderately sharp cut-off, may be utilized although we have found that on some types of equipment, a cut-off slope of about 18 db per octave is about the maximum that will perform satisfactorily. The cut-off frequency may be chosen at any convenient frequency such as $3/\tau$. The smaller this value is chosen, the smoother will be the resulting trace but the less will be the contrast between echo and reverberation (because the filter begins to average the signal echo as well). For example, we have found that for operation with certain types of echo-ranging equipment a wave filter comprised of one-half section of an $m$-derived $(m=0.6)$ low-pass, followed by a full section, constant $k$ low-pass, terminated by one-half section of an $m$-derived $(m=0.8)$ low-pass is very useful. In this case the design was arranged that the cut-off frequency could be set for 100, 220, 465 or 1000 cycles per second. In another case, a simpler form of the resistance-capacitance type with three meshes was utilized. The R. C. product was made constant for all meshes, but the R./C. ratio was increased by two orders of magnitude in each successive mesh. Of course, where the invention is used as a part of existing equipment proper consideration must be given to choosing the terminating impedances such that proper operation of the gear is not interfered with.

Having described our invention, we claim:

1. In a system of echo ranging by measuring the elapsed time interval between a transmitted impulse and the reflection thereof from an object whose range is to be determined, the combination comprising first means for transmitting a carrier frequency modulated burst of energy, second means for receiving the echoes resulting from said transmitted burst of energy, an amplitude detector operative to provide output signals dependent upon the amplitude of signals from said second means, a low pass filter means coupled to the output of said amplitude detector for removing from the output thereof all of the frequency components above those frequencies needed to reproduce the envelope of said transmitted burst of energy, indicating means for presenting a visual presentation of the signals fed to the input thereof, means coupling the output of said low pass filter means to the input of said indicating means.

2. In a system of echo ranging by measuring the elapsed time interval between a transmitted impulse and the reflection thereof from an object whose range is to be determined, the combination comprising first means for transmitting a frequency modulated burst of sound energy, second means for receiving the echoes resulting from said transmitted burst of sound energy, a rectifier operative to provide output signals dependent upon the amplitude of signals from said second means, a low pass filter means coupled to the output of said rectifier for removing from the output thereof all of the frequency components above those frequencies needed to reproduce the envelope of said transmitted burst of sound energy, indicating means for presenting a visual presentation of the signals fed to the input thereof, means coupling the output of said low pass filter means to the input of said indicating means.

CARL H. ECKART.
GEORGE W. DOWNS, JR.

REFERENCES CITED

The following references are of record in the file of this patent:

UNITED STATES PATENTS

| Number | Name | Date |
| --- | --- | --- |
| 2,011,392 | Bentley | Aug. 13, 1935 |
| 2,143,035 | Smith | Jan. 10, 1939 |
| 2,236,893 | Chaffee | Apr. 1, 1941 |
| 2,253,975 | Guanella | Aug. 26, 1941 |
| 2,268,587 | Guanella | Jan. 6, 1942 |
| 2,410,066 | Harrison | Oct. 29, 1946 |
| 2,410,067 | Harrison | Oct. 29, 1946 |
| 2,433,361 | Harrison | Dec. 30, 1947 |
| 2,492,012 | Smith | Dec. 20, 1949 |

FOREIGN PATENTS

| Number | Country | Date |
| --- | --- | --- |
| 368,778 | Great Britain | Mar. 7, 1932 |